United States Patent [19]
Maddalozzo, Jr. et al.

[11] Patent Number: 6,105,029
[45] Date of Patent: Aug. 15, 2000

[54] RETRIEVING NETWORK FILES THROUGH PARALLEL CHANNELS

[75] Inventors: John Maddalozzo, Jr.; Gerald Francis McBrearty, both of Austin; Shawn Patrick Mullen, Buda; Johnny Meng-Han Shieh, Austin, all of Tex.

[73] Assignee: International Business Machines Corporation, Armonk, N.Y.

[21] Appl. No.: 08/931,879

[22] Filed: Sep. 17, 1997

[51] Int. Cl.[7] .................................................. G06F 17/30
[52] U.S. Cl. ........................ 707/10; 707/1; 395/200.31
[58] Field of Search ................................. 707/10, 1, 200; 711/114; 370/477; 395/200.31

[56] References Cited

U.S. PATENT DOCUMENTS

| | | | |
|---|---|---|---|
| 5,021,976 | 6/1991 | Wexelblat et al. | 364/521 |
| 5,361,202 | 11/1994 | Doue | 705/3 |
| 5,379,424 | 1/1995 | Morimoto et al. | 395/600 |
| 5,426,645 | 6/1995 | Haskin | 370/477 |
| 5,452,468 | 9/1995 | Peterson | 395/800 |
| 5,506,984 | 4/1996 | Miller | 395/600 |
| 5,532,939 | 7/1996 | Psinakis et al. | 395/200.56 |
| 5,542,087 | 7/1996 | Neimat et al. | 395/600 |
| 5,546,517 | 8/1996 | Marks et al. | 395/145 |
| 5,557,722 | 9/1996 | DeRose et al. | 395/148 |
| 5,603,025 | 2/1997 | Tabb et al. | 396/602 |
| 5,608,446 | 3/1997 | Carr et al. | 348/6 |
| 5,621,864 | 4/1997 | Benade et al. | 395/117 |
| 5,751,968 | 5/1998 | Cohen | 395/200.61 |
| 5,761,683 | 6/1998 | Logan et al. | 707/513 |

*Primary Examiner*—Paul R. Lintz
*Assistant Examiner*—Ella Colbert
*Attorney, Agent, or Firm*—Robert V. Wilder; Leslie A. Van Leeuwen

[57] ABSTRACT

A method and apparatus is provided in which a site selection program is operable to selectively initiate sample testing of data transfer speed of a plurality of sites containing a predetermined data file. The methodology calculates a priority ordering of the plurality sites based upon the sample testing of data transfer speed, and divides the data file into portions for parallel access and delivery of the requested data file such that all of the portions are delivered to the user at approximately the same time, whereby faster channels will be requested to access and deliver larger file portions and relatively slower channels will be assigned to access and deliver relatively smaller portions of the requested data file. Upon receipt of the portions, the requested data file is assembled for further processing by the user.

42 Claims, 4 Drawing Sheets

| SITE | SAMPLE TIME | RELATIVE SAMPLE | INVERSION | DECIMAL | RELATIVE DECIMAL | BYTES (X 60,000) |
|---|---|---|---|---|---|---|
| A | 4 | 4/15 | 15/4 | 3.75 | 3.75/ 18.75 | 12,000 |
| B | 6 | 6/15 | 15/6 | 2.50 | 2.50/ 18.75 | 8,000 |
| C | 3 | 3/15 | 15/3 | 5.00 | 5.00/ 18.75 | 16,000 |
| D | 2 | 2/15 | 15/2 | 7.50 | 7.50/ 18.75 | 24,000 |

RETRIEVING NETWORK FILES THROUGH PARALLEL CHANNELS

RELATED APPLICATIONS

The present application is related to co-pending applications entitled "APPARATUS AND METHOD FOR SELECTING AN OPTIMUM TELECOMMUNICATIONS LINK", Ser. No. 08/876,413, filed on Jun. 16, 1997, pending, and "RETRIEVING STORED FILES THROUGH PARALLEL CHANNELS", Ser. No. 08/931,880, filed on Sep. 17, 1997, pending, both assigned to the assignee of the present application.

FIELD OF THE INVENTION

The present invention relates generally to information processing systems and more particularly to an improved methodology for retrieving information files from remote locations.

BACKGROUND OF THE INVENTION

As computer systems and networked computer systems proliferate, information access time becomes more critical. For many reasons, access time to information databases has a tendency to increase even with frequent equipment upgrades and technology advances. This tendency is apparent in mostly all database accesses which involve telecommunications links and is especially visible to the growing number of users of the Internet and worldwide web applications where extensive graphics are implemented.

In most cases, a user has no informed control over the telecommunications link chosen to access sites on the Internet or the "net". Most Internet applications provide a user a plurality of selections for accomplishing a "search" for specific information in which a user may be interested. In those cases, the access speed may depend upon the search engine program design and also upon the telecommunications link and the data path selected. Once a user selects a search engine and then later selects a data path, if the data is coming in at too slow of a rate, the only course of action available to the user would be to stop the transaction and begin again using another selected engine or data path.

In other applications, a link screen is provided for the user to select one or a plurality of "web sites" where each web site is a so-called "mirror site", i.e. one of several listed sites which contain copies of the same information which is sought by the user. Each site may be served by the same server or a different server in the same room or a different server in another city or even in another country. The access times to any of the servers would also depend on a number of factors including the number of users logged on to the access page or using the telecommunications link at any given time. Generally, a user is informed of the choices of multiple sites which have the data or the document desired by the user, but is only allowed to select one site at a time.

Moreover, the fastest link at a given access time for one user may be the slowest link several minutes later for another user who may be attempting to use the same link. In some cases, access to mirror sites in foreign countries will provide faster access and data transfer time than corresponding sites in the same neighborhood as a user. Thus, a user may have successfully used a link or site on one day with great success and satisfaction but, later in the day, a subsequent use of the same link or site will not provide satisfactory results. In that case the user's only recourse to speed-up the transaction is to stop the current transaction and retry the access using a different mirror site selection. Unfortunately, that solution is not satisfactory either since much transaction time is lost in re-logging and engine start-up routines in addition to the time lost in waiting for results to return from the first site selection.

Further, when a user terminates one channel because it is perceived to be too slow, and selects another channel to transfer a document or file from a remote site, the second channel selected may turn out to be even slower than the first channel thereby exacerbating the problem.

Accordingly, there is a need for an enhanced method and processing apparatus which is effective to conduct real-time testing of a plurality of data channels available for use to access a given file or document, and to determine the most efficient method for accessing and delivering such data files or documents to a user.

SUMMARY OF THE INVENTION

A method and apparatus is provided in which a site selection program is operable to selectively initiate sample testing of data transfer speed of a plurality of sites containing a predetermined data file. The methodology calculates a priority ordering of the plurality sites based upon the sample testing of data transfer speed, and divides the data file into portions for parallel access and delivery of the requested data file such that all of the portions are delivered to the user at approximately the same time whereby faster channels will be requested to access and deliver larger file portions and relatively slower channels will be assigned to access and deliver relatively smaller portions of the requested data file. Upon receipt of the portions, the requested data file is assembled for further processing by the user.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
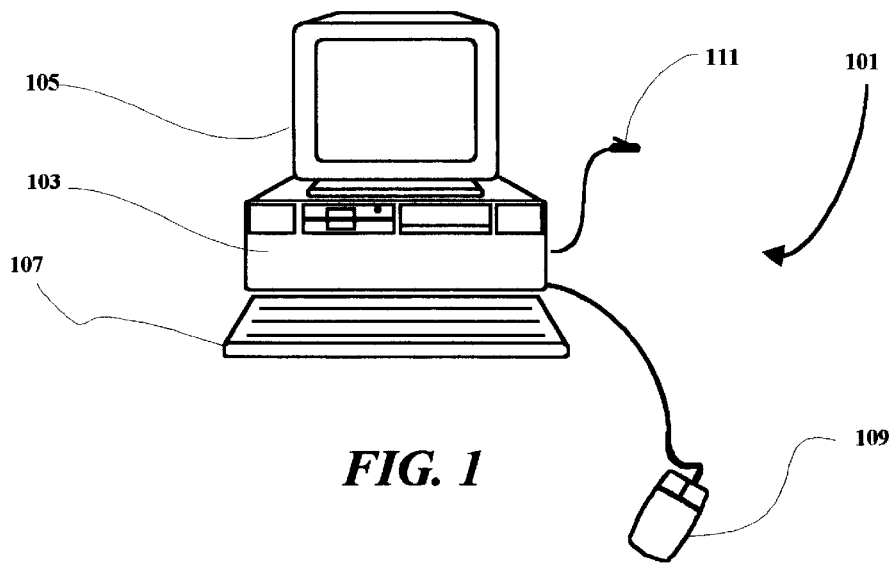
FIG. 1 is a diagram of a computer system in which the present invention may be implemented.

With reference to FIG. 1, the various methods discussed herein may be implemented within a typical computer system 101 which may include a workstation or personal computer. In general, an implementing computer system may include a plurality of processors in a multi-bus system in a network of similar systems. However, since the workstation or computer system 101 within which the present invention is implemented is, for the most part, generally known in the art and composed of electronic components and circuits which are also generally known to those skilled in the art, circuit details beyond those shown in FIG. 1, will not be explained to any greater extent than that considered necessary as illustrated, for the understanding and appreciation of the underlying concepts of the present invention and in order not to obfuscate or distract from the teachings of the present invention.

In FIG. 1, the computer system includes a processor unit 103 which is typically arranged for housing a processor circuit along with other component devices and subsystems of the computer system 101. The computer system 101 also includes a monitor unit 105, a keyboard 107 and a mouse or pointing device 109, which are all interconnected with the computer system illustrated. Also shown is a connector 111 which is arranged for connecting a modem within the computer system to a communication line such as a telephone line in the present example. The present invention may also be implemented in a cellular system in which case the connector 111 would not be required.

Figure 2:
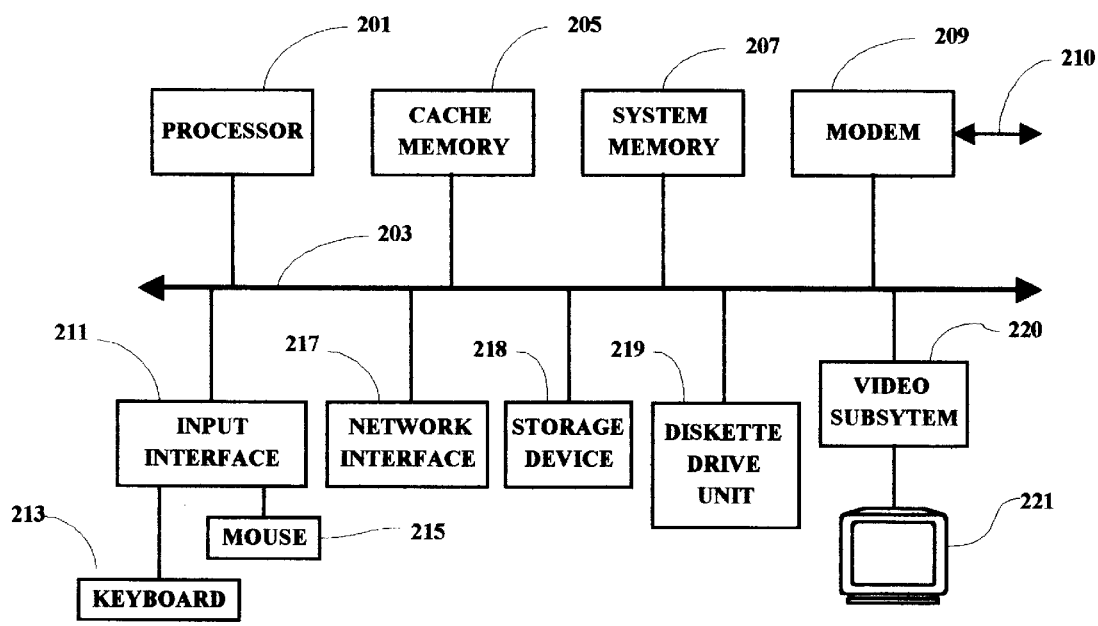
FIG. 2 is a simplified schematic diagram showing selected components and subsystems of the computer system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a network interface subsystem 217 and a diskette drive unit 219. A video subsystem 220, which may include a graphics subsystem, is connected to a display device 221. A storage device 218, which may comprise a hard drive unit, is also coupled to the bus 203. The diskette drive unit provides a means by which individual diskette programs may be loaded on to the hard drive, or accessed directly, for selective execution by the computer system 101. As is well known, program diskettes containing application programs represented by magnetic indicia on the diskette, may be read from the diskette drive, and the computer system is selectively operable to read such magnetic indicia and create program signals. Such program signals are selectively effective to cause the computer system to present displays on the screen of a display device and respond to user inputs in accordance with the functional flow of the application program on the diskette. Although the present example is explained in connection with magnetic media storage system, it is understood that media other than magnetic media, including but not limited to optical CDs and solid state digital devices, may also be implemented in addition to or in place of the magnetic media for storing, and making available application programs and/or application data.

In running an Internet access program or browser program on the computer system 101, the access program is typically stored in the storage device 218 and either selectively or automatically, partially or totally, loaded into the system memory 207 when the system is initially powered-on, or at a later time if so desired by a user. The browser is selectively operable to access and execute a site selection program, as herein described, either directly from a diskette in the diskette drive unit 219 or directly from a copy of the site selection program stored on the hard drive unit 218. As a program is running, either a portion of the program or the entire program may be loaded into the system memory 207 and/or the system cache memory 205. Depending on specific program design, the system may store any information accessed from a database in the storage unit 218, the cache memory 205, the system memory 207 or directly from a diskette loaded into the diskette drive 219. Assuming a user has started-up the system, and is actively running an Internet program from memory, a series of screens will be displayed to the user on the display device 221. Each screen typically has one or more selections for the user to make in navigating through the program. In general, a user will make selections from a display screen using the keyboard 213 or the mouse or pointer device 215. In an Internet operating program, the selections made by the user will determine "where" the user "goes", i.e. to what "site", and also, in some cases, the communications link or the path taken to get to the site selected.

Figures 3, 6:
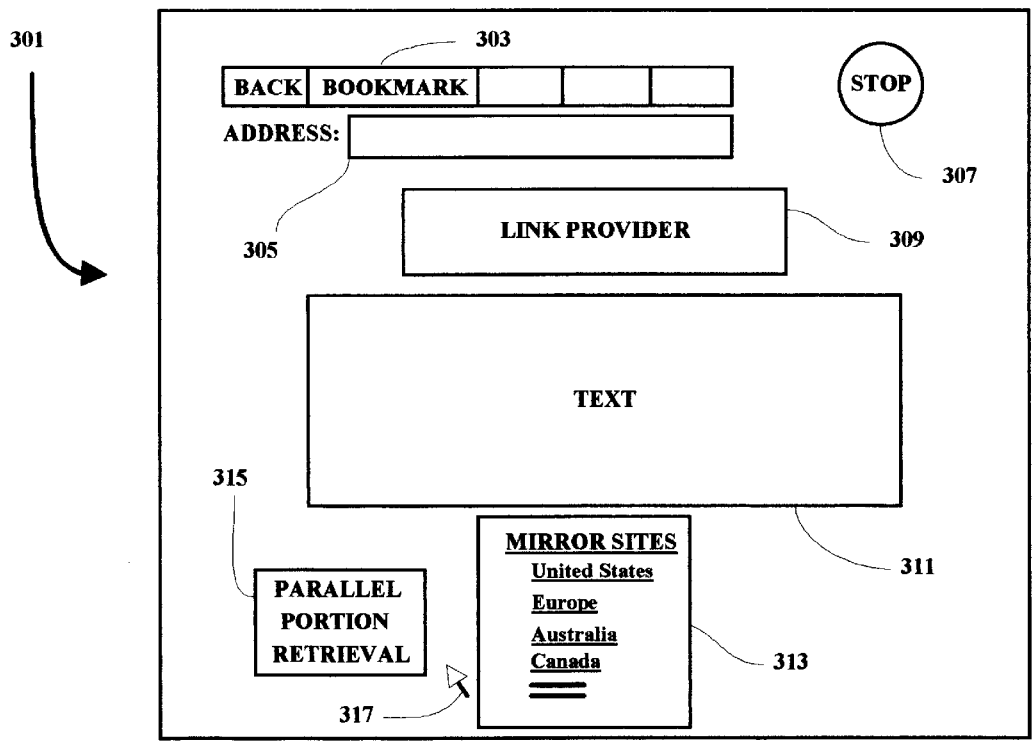
FIG. 3 is an illustration of an exemplary display screen for reference in explaining the present invention.
FIG. 6 is a table illustrating one example of sizing parallel document portion requests.

FIG. 3 illustrates a typical program screen display 301 in an Internet operating session. The screen generally includes a row or group of operating tools 303 from which a user may select by pointing the pointer 317 using the mouse device 215, for example. The screen also shows an address block 305 and a "STOP" button 307. The STOP button may be selected and invoked if the user wishes to terminate or stop a transmission of data from another computer or server. In many cases, a user will request a data transfer or to go to a selected site by typing in an address 305, but as the requested transaction is processing, the user sees that it is taking too much time. In that case the user may, using the mouse 215, "point and click" on the STOP button 307, and the program will stop the transmission and return the user to the previous screen to make another selection. In that case, the user will lose the time already invested in the initial site selection, as well as the transfer time and the time it takes to renew the previous screen in order to make another selection. Even after the user makes another selection of a site to visit or a link for going there, there is no guarantee that the second choice will be any faster than the first choice.

The display screen illustrated in FIG. 3 also typically includes the identity of a "LINK PROVIDER" 309 and a text section 311 for displaying selected text information and other material to a user. Near the bottom of the screen 301 in the present example, is a "site listing" section 313 which displays a plurality of "mirror sites" available for selection by the user in "going to" or linking-up with a site which has the information desired by the user. As illustrated, there are typically a plurality of such mirror sites and the user is free to select any one of the identified sites to link-up with that site to access the desired information. However, as hereinbefore explained, there is generally no indication of which site would provide the most efficient and fastest data path for the user to select. As hereinbefore noted, the fastest and most efficient of the sites displayed may change from moment to moment depending upon many factors including the number of users that are presently logged in to the site at any given time. In some cases, it will be a more efficient site to access the desired page with the "Europe" page rather than the "United States" selection. Heretofore, a user had no way of knowing which site would be the most efficient on a real time basis.

A "PARALLEL PORTION RETRIEVAL" button 315 is provided in the present example, which the user may invoke with the pointer 317 by "pointing and clicking" the mouse pointer 317 within the designated area 315 on the screen. Alternatively, the methodology disclosed herein may be automatically implemented without a specific user selection in which case no sensitized screen area would be necessary. Following the methodology executed by invoking the PARALLEL PORTION RETRIEVAL operation, an optional screen may be presented (not shown) to allow the user to choose selected ones of the mirror sites available or to choose that all of the available sites be used in the parallel access. Later when the program divides the request into portions of the requested data file or document, only the selected sites would be used and the number of portions would be determined according to the user selections. If the parallel access feature is automatic and not visible or available to the user, all of the available channels would be tested for speed and all of the available channels would carry a designated portion of the parallel data request as determined by the program in accordance with the tested channel speed.

Figure 4:
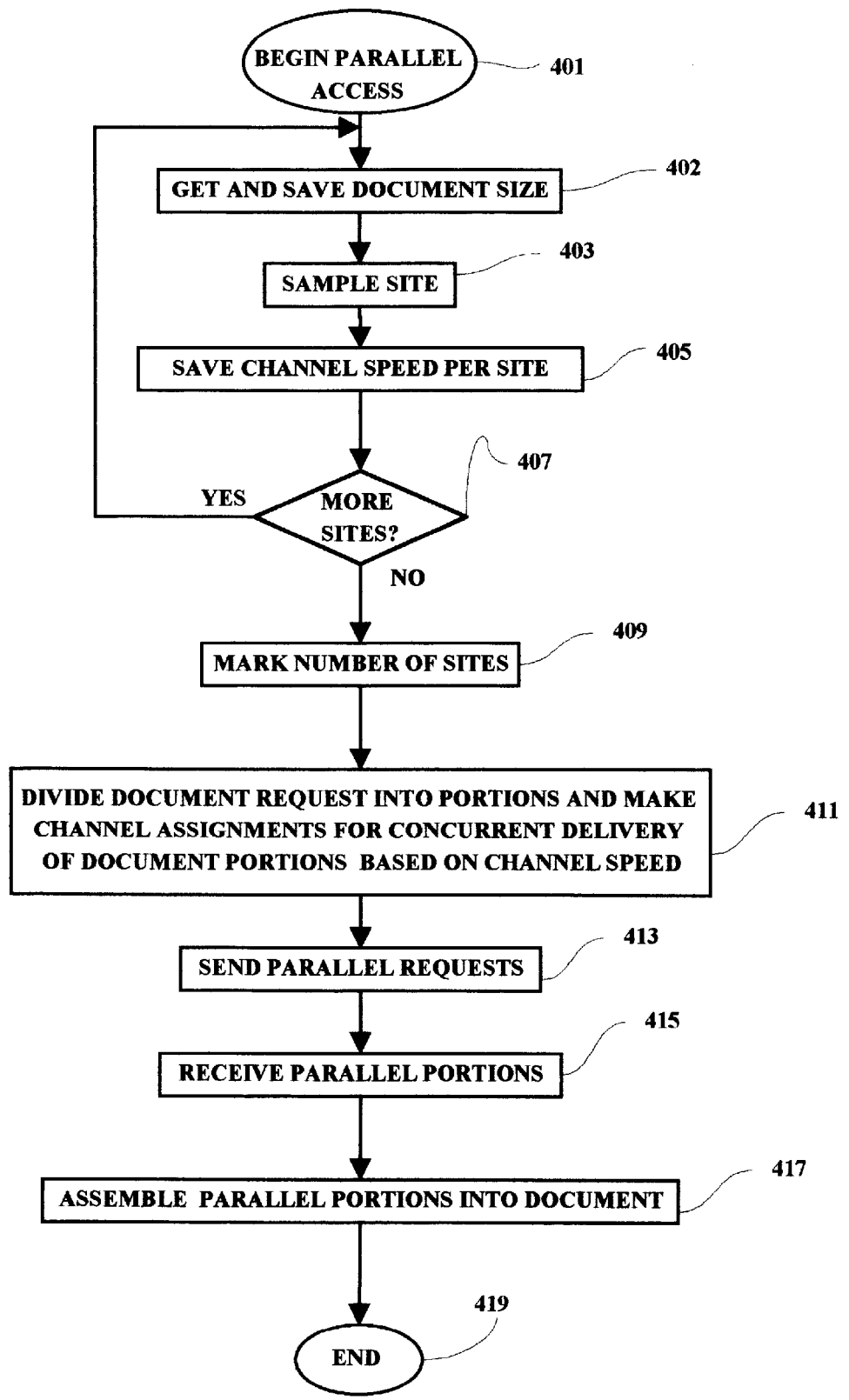
FIG. 4 is a flow chart illustrating the details of the request segmentation, access and delivery of a data file request in accordance with the disclosed methodology.

FIG. 4 is a flow chart illustrating an exemplary operational routine used in implementing the present invention. When the PARALLEL PORTION RETRIEVAL button 315 on the display screen 301 has been selected 403 and activated with the pointer device 317 for example, the parallel access methodology 401 is invoked and the program determines and saves 402 the document size of the document being requested from the remote site. Generally, the size of the requested document or file is known to the program from an earlier step when the user identifies the requested document, but if the document size is not so available, then the program will get the size of the document at the time the site is sampled, and save the document size for later reference when the program divides the document request into a plurality of parallel requests. Each of the sites 313 is sampled 403 to obtain current or real time sampling speed, and the channel speeds thereby obtained are saved 405 on a per site basis such that the program "knows" which site channels are faster than others at the time the document or file is being requested. The sampling process continues until no more sites remain to be sampled 407. In an alternative embodiment, a user may choose only selected ones of the sites 313 for parallel access in which case only the selected sites would be sampled and used in the parallel access and retrieval.

After the sites have been sampled, the program marks the number of sites sampled 409, and then divides 411 the user document or file request into a plurality of simultaneous document portion requests with each portion request comprising a request for a different portion of the total document. Each document portion request is sized and assigned to a different channel in accordance with the number of channels, the size of the total document and the speed of the channels as determined by the program, so that the portions of the document will all arrive at the requesting user's station from the plurality of servers or sites, at approximately the same time. For example, for a document of 60,000 bytes which available at four sites A, B, C, and D, with sample acquisition times of 4, 6, 3 and 2 seconds, respectively, the program would divide the document request into four document portion requests, with the site "D" request being for a greater share of the total document since site D sampled in the shortest amount of time. The next smaller request would be sent to site "C" (3 second sample), then site "A" (4 second sample) and the smallest document portion request would be assigned to be sent to site "B" which had the longest sample time of 6 seconds. An example of one exact method of determining portion request size for parallel access and retrieval is shown in FIG. 6. However, it should be noted that the present invention teaches the use and implementation of any method that assigns document portion size generally in an order related to the site sample times such that the faster sites deliver relatively more of a requested document.

As noted, there are many methods of varying precision which may be implemented to determine the byte size of each document portion request. Any such method may be implemented herein so long as the method is related to the speed of the channel or site with the fastest site delivering a relatively greater portion of the requested document, such that all of the portions or segmented requests arrive at approximately the same time to the user. After the request sizes have been determined 411, parallel requests 413 are sent to the sites 313. When the requests have been satisfied and received 415 at approximately the same time, the requested document or file is assembled 417 and the process ends 419.

Figure 5:
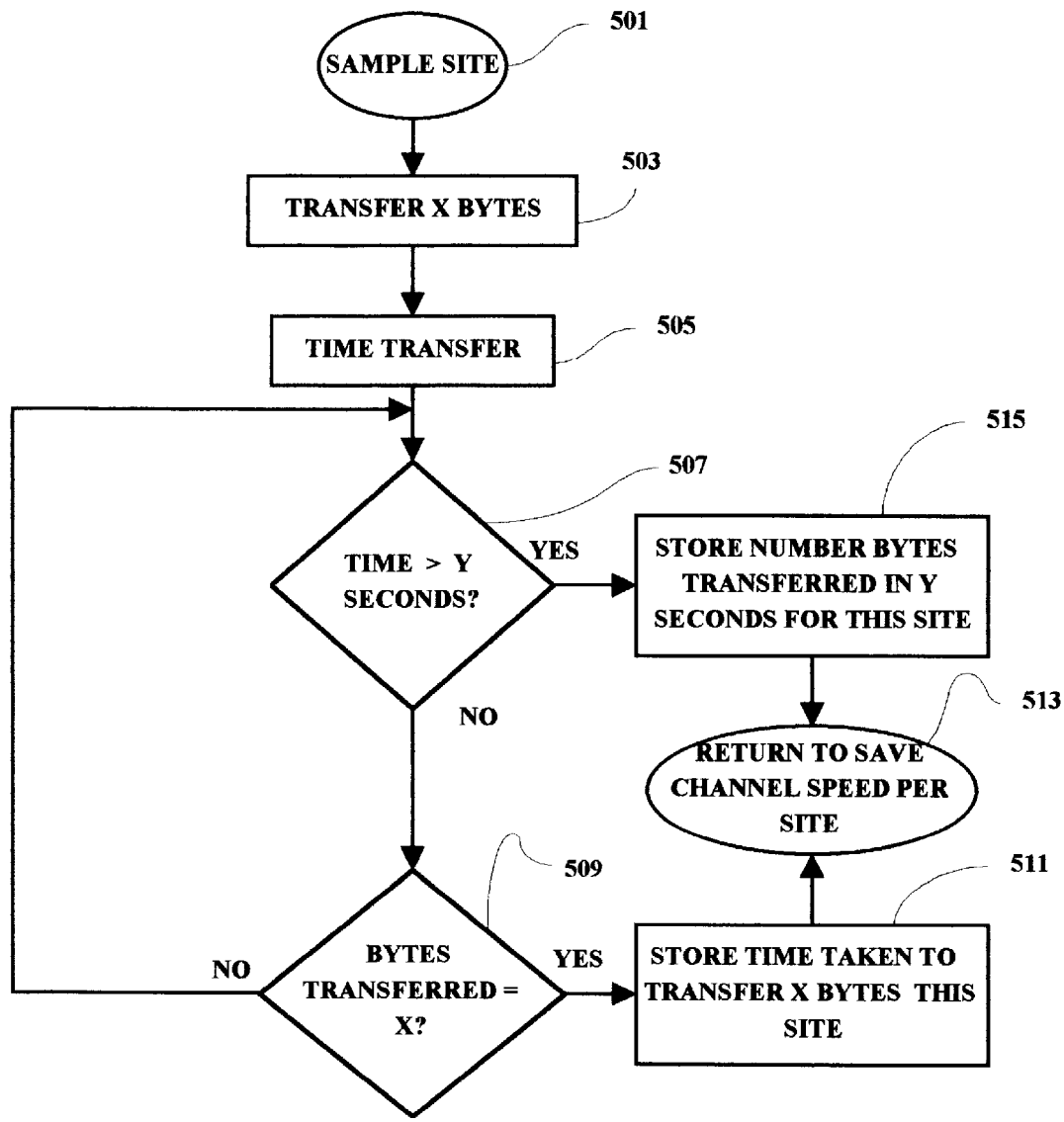
FIG. 5 is a flow chart illustrating the details of one segment of the flow chart shown in FIG. 4.

In FIG. 5, an exemplary implementation of the "sample" function 403 is illustrated. When the "Sample Site" function is invoked 501, the program begins to transfer "X" bytes 503 from each site being checked. At that time the program starts a timer to time the transfer 505. So long as the time taken to transfer X bytes is less than a predetermined value "Y" 507, the process will continue to monitor the transfer process until the number of bytes that have been transferred is equal to the predetermined sample amount "X" 509. At that time, the time taken to transfer the X bytes from the site being sampled is stored 511, and the process returns 513 to the "SAVE CHANNEL SPEED PER SITE" step 405. When the transfer time exceeds a predetermined threshold transfer time "Y" 507, then the transfer process is cut short at the predetermined time "Y" and the number of bytes transferred during that time is "remembered" or stored 515 (typically in system memory 207 or cache memory 205), and the process continues to SAVE CHANNEL SPEED PER SITE 405.

The value of "X" would be chosen to be sufficient to provide a fair indication of the transfer time using the particular site being checked, but not so large as to unduly slow down the selection process. In the event the transfer of the sample bytes takes more time than a predetermined threshold time "Y", then the process will switch over to a "Bytes transferred per unit time" mode for that particular site (rather than the default "Time taken for X Byte transfer" criterion) for purposes of determining the most efficient site.

As a result of the SAMPLE SITE process 501, the program acquires current information concerning the speed of each mirror site channel. The program then takes the document size 402 and divides the document size 411 into parallel simultaneous requests to be sent to the designated sites. The size of each channel request varies depending upon the speed of each channel with the higher speed channels requesting file portions of relatively greater size than the slower speed channels as hereinbefore described.

In FIG. 6, one method of sizing parallel document portion requests is illustrated. Column 1 identifies the available sites i.e. sites A, B, C and D. Column 2 lists the sample times associated with each of the sites, i.e. 4 seconds, 6 seconds, 3 seconds and 2 seconds, respectively. Column 3 is each site sample time divided by a total sample time reference obtained by adding all of the sample times together. Column 4 is obtained by inverting the values in column 3. Column 5 is the decimal equivalent of the fraction in column 4. Column 6 is each value from column 5 divided by a denominator determined by summing the values in column 5. Column 7 is obtained by multiplying each value in column 6 by 60,000 bytes, which is the size of the entire document requested. The column 7 value represents the individual byte sizes for the parallel requests to the four sites for the entire 60,000 byte document with each request being sized to optimize channel speed such that the parallel requests are all delivered at approximately the same time.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The monitoring methodology may also be implemented solely in program code stored on a disk or diskette (portable or fixed), or other memory device, from which it may be executed to monitor and/or report system resource conditions as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for accessing a data file by a user over a network from a remote location, said method comprising:
   determining a group of a first number of sites containing the data file;
   dividing the data file into a plurality of data file segments, said plurality corresponding in number to said first number of sites; and
   accessing said sites through separate channels for transmission of said data file segments to the user, said accessing said sites being accomplished substantially in parallel.

2. The method as set forth in claim 1 and further including:
   providing a selection option to the user for selecting only predetermined ones of said sites for accessing.

3. The method as set forth in claim 1 wherein said data file segments are of differing sizes.

4. The method as set forth in claim 3 and further including:
   sampling data transfer speed of said separate channels; and
   assigning different sizes of said data file segments to different ones of said separate channels.

5. The method as set forth in claim 4 wherein said assigning is accomplished by assigning larger data file segments to faster ones of said separate channels.

6. The method as set forth in claim 5 and further including, after said assigning, sending requests for said data file segments substantially simultaneously to said group of sites whereby said data file segments are returned to the user and said returns are completed in a substantially concurrent time period.

7. The method as set forth in claim 6 and further including:
   assembling said data file segments into said data file upon receipt of said data file segments from said group of sites.

8. The method as set forth in claim 3 wherein data transfer speed is measured in bytes transferred per second, said sampling including measuring time taken to transfer a predetermined number of sample bytes.

9. The method as set forth in claim 3 wherein data transfer speed is measured in bytes transferred from each site during a predetermined maximum sample time period for each site.

10. The method as set forth in claim 3 wherein data transfer speed is measured in bytes transferred per second, said sampling further including measuring bytes transferred from each site during a predetermined maximum sample time period for sites which transfer less than a predetermined number of bytes during said maximum sample time period.

11. The method as set forth in claim 2 wherein said selection option includes:
    displaying an activation area on a display screen, whereby the user may select, through an input device, said predetermined ones of said sites.

12. The method as set forth in claim 11 wherein said input device is a mouse device.

13. The method as set forth in claim 11 wherein said input device is a keyboard device.

14. The method as set forth in claim 12 wherein said input device includes a keyboard device in addition to said mouse device.

15. A storage medium including machine readable indicia, said storage medium being selectively coupled to a reading device, said reading device being selectively coupled to processing circuitry within a computer system, said reading device being selectively operable to read said machine readable indicia and provide program signals representative thereof, said program signals being selectively effective for enabling a user to access a data file from a remote site through a network by:
    determining a group of a first number of sites containing the data file;
    dividing the data file into a plurality of data file segments, said plurality corresponding in number to said first number of sites; and
    accessing said sites through separate channels for transmission of said data file segments to the user, said accessing said sites being accomplished substantially in parallel.

16. The medium as set forth in claim 15 wherein said program signals are further selectively effective for:
    providing a selection option to the user for selecting only predetermined ones of said sites for accessing.

17. The medium as set forth in claim 15 wherein said data file segments are of differing sizes.

18. The medium as set forth in claim 17 wherein said program signals are further selectively effective for:
    sampling data transfer speed of said separate channels; and
    assigning different sizes of said data file segments to different ones of said separate channels.

19. The medium as set forth in claim 18 wherein said assigning is accomplished by assigning larger data file segments to faster ones of said separate channels.

20. The medium as set forth in claim 19 wherein said program signals are further selectively effective for, after said assigning, sending requests for said data file segments substantially simultaneously to said group of sites whereby said data file segments are returned to the user and said returns are completed in a substantially concurrent time period.

21. The medium as set forth in claim 20 wherein said program signals are further selectively effective for:
    assembling said data file segments into said data file upon receipt of said data file segments from said group of sites.

22. The medium as set forth in claim 17 wherein data transfer speed is measured in bytes transferred per second, said sampling including measuring time taken to transfer a predetermined number of sample bytes.

23. The medium as set forth in claim 17 wherein data transfer speed is measured in bytes transferred from each site during a predetermined maximum sample time period for each site.

24. The medium as set forth in claim 17 wherein data transfer speed is measured in bytes transferred per second, said sampling further including measuring bytes transferred from each site during a predetermined maximum sample time period for sites which transfer less than a predetermined number of bytes during said maximum sample time period.

25. The medium as set forth in claim 16 wherein said selection option includes:

displaying an activation area on a display screen, whereby the user may select, through an input device, said predetermined ones of said sites.

26. The medium as set forth in claim 25 wherein said input device is a mouse device.

27. The medium as set forth in claim 25 wherein said input device is a keyboard device.

28. The medium as set forth in claim 26 wherein said input device includes a keyboard device in addition to said mouse device.

29. An information processing system comprising:

a processing device;

a memory unit; and a bus connecting said processing device and said memory unit, said processing device being selectively operable for executing a program from said memory for selectively enabling a user to access a data file from a remote site through a network by:

determining a group of a first number of sites containing the data file;

dividing the data file into a plurality of data file segments, said plurality corresponding in number to said first number of sites; and accessing said sites through separate channels for transmission of said data file segments to the user, said accessing said sites being accomplished substantially in parallel.

30. The information processing system set forth in claim 29 and further including:

providing a selection option to the user for selecting only predetermined ones of said sites for accessing.

31. The information processing system set forth in claim 29 wherein said data file segments are of differing sizes.

32. The information processing system set forth in claim 31 and further including:

sampling data transfer speed of said separate channels; and assigning different sizes of said data file segments to different ones of said separate channels.

33. The information processing system set forth in claim 32 wherein said assigning is accomplished by assigning larger data file segments to faster ones of said separate channels.

34. The information processing system set forth in claim 33 and further including, after said assigning, sending requests for said data file segments substantially simultaneously to said group of sites whereby said data file segments are returned to the user and said returns are completed in a substantially concurrent time period.

35. The information processing system set forth in claim 34 and further including:

assembling said data file segments into said data file upon receipt of said data file segments from said group of sites.

36. The information processing system set forth in claim 31 wherein data transfer speed is measured in bytes transferred per second, said sampling including measuring time taken to transfer a predetermined number of sample bytes.

37. The information processing system set forth in claim 31 wherein data transfer speed is measured in bytes transferred from each site during a predetermined maximum sample time period for each site.

38. The information processing system set forth in claim 31 wherein data transfer speed is measured in bytes transferred per second, said sampling further including measuring bytes transferred from each site during a predetermined maximum sample time period for sites which transfer less than a predetermined number of bytes during said maximum sample time period.

39. The information processing system set forth in claim 30 wherein said selection option includes:

displaying an activation area on a display screen, whereby the user may select, through an input device, said predetermined ones of said sites.

40. The information processing system set forth in claim 39 wherein said input device is a mouse device.

41. The information processing system set forth in claim 39 wherein said input device is a keyboard device.

42. The information processing system set forth in claim 40 wherein said input device includes a keyboard device in addition to said mouse device.

\* \* \* \* \*